(12) United States Patent
Curry (10) Patent No.: US 6,266,223 B1
(45) Date of Patent: Jul. 24, 2001

(54) LINE PROTECTOR FOR A COMMUNICATIONS CIRCUIT

(75) Inventor: William J. Curry, Angier, NC (US)

(73) Assignee: Tyco Electronics Corporation, Middletown, PA (US)

( * ) Notice: Subject to any disclaimer, the term of this patent is extended or adjusted under 35 U.S.C. 154(b) by 0 days.

(21) Appl. No.: 09/345,060

(22) Filed: Jun. 30, 1999

(51) Int. Cl.[7] .................................................. H02H 9/04
(52) U.S. Cl. ........................................................ 361/119
(58) Field of Search ..................................... 361/111, 117, 361/118, 119, 120, 124, 126, 127

(56) References Cited

U.S. PATENT DOCUMENTS

| | | | |
|---|---|---|---|
| 3,571,658 | 3/1971 | Knoth | 317/14 |
| 3,725,613 | 4/1973 | Allen et al. | 179/175.3 |
| 3,944,753 | 3/1976 | Proctor et al. | 179/84 |
| 3,950,676 | 4/1976 | Dornseifer et al. | 317/14 |
| 4,039,763 | 8/1977 | Angner et al. | 179/99 |
| 4,203,006 | 5/1980 | Mascia | 179/2 |
| 4,254,442 | 3/1981 | Dijkmans et al. | 361/56 |
| 4,254,447 | 3/1981 | Griffis | 361/386 |
| 4,455,586 | 6/1984 | McCartney | 361/56 |
| 4,536,618 | 8/1985 | Serrano | 179/84 |
| 4,544,983 | 10/1985 | Anderson et al. | 361/119 |
| 4,586,104 | 4/1986 | Standler | 361/91 |
| 4,591,666 | 5/1986 | Boeckmann | 179/90 |
| 4,628,398 | 12/1986 | Cook | 361/120 |
| 4,758,920 | 7/1988 | McCartney | 361/119 |
| 4,866,563 | 9/1989 | Howard et al. | 361/124 |
| 4,907,120 | 3/1990 | Kaczmarek et al. | 361/119 |
| 5,379,176 | 1/1995 | Bacon et al. | 361/106 |
| 5,416,663 | 5/1995 | Atkins | 361/119 |
| 5,513,059 | 4/1996 | Atkins | 361/56 |
| 5,721,663 | 2/1998 | Smith et al. | 361/119 |

FOREIGN PATENT DOCUMENTS

| | | | |
|---|---|---|---|
| 1 513 038 | 9/1965 | (DE) | H02H/9/00 |
| 23 34 698 | 7/1973 | (DE) | H02H/3/20 |
| 197 08 802 | 10/1998 | (DE) | H02H/9/00 |
| 0 186 873 | 7/1986 | (EP) | H02H/9/04 |
| 0 327 359 | 8/1989 | (EP) | H04M/3/18 |
| 0 338 107 | 1/1991 | (EP) | H02H/9/04 |
| 2 504 323 | 4/1981 | (FR) | H02H/9/04 |
| 2 172 453 | 9/1988 | (GB) | H02H/9/04 |
| 2 267 789 | 12/1993 | (GB) | H02H/9/04 |
| 92 06523 | 4/1992 | (WO) | H02H/9/00 |

*Primary Examiner*—Ronald W. Leja
(74) *Attorney, Agent, or Firm*—Myers Bigel Sibley & Sajovec (57) ABSTRACT

A line protector is provided which includes positive temperature coefficient resistors in the circuit which are thermally coupled to voltage clamping devices which require protection from failures caused by overheating from conducting excessive amounts of current for a time sufficient to cause device breakdown. This may compensate for the performance variability of the positive temperature coefficient resistors so as to improve the likelihood that they will experience a sufficient temperature increase to switch before the voltage clamping device reaches a breakdown temperature. Furthermore, a line protector which may provide protection against current flow to the communications circuit from overvoltage conditions on the circuit side of the line protector or by a ground potential difference between the line protector and the communications circuit is also provided including positive temperature coefficient resistors positioned between the overvoltage line protector circuits and the communications circuit.

13 Claims, 3 Drawing Sheets

LINE PROTECTOR FOR A COMMUNICATIONS CIRCUIT

FIELD OF THE INVENTION

The present invention relates to protection devices for a communications circuit. More particularly, the present invention relates to protection devices for telephone communications circuits.

BACKGROUND OF THE INVENTION

Various approaches have been taken to protect telecommunications transmission lines and associated telecommunications circuits and equipment coupled to the lines from overvoltage and overcurrent conditions that may occur on the incoming lines. Such conditions may occur as a result of a variety of conditions including lightning strikes and AC power line related fault events.

The earliest techniques for providing such protection included spark gap protectors and carbon block overvoltage protectors. Various protector devices are available which include both primary and secondary protection stages. For example, gas tube protectors have been coupled with an air gap back-up protection in a protector device so that if the primary surge arrestor, the gas tube protector, were to fail, the back-up device takes over thereby generally protecting the communications circuits from transient overvoltage events.

Other design approaches have utilized solid state voltage clamping devices, such as diodes, in combination with gas discharge type overvoltage arrestors. The solid state devices may be configured to provide purely back-up protection under failure conditions of the gas discharge tube or may be configured as true hybrid protection stages in the device. The hybrid application typically utilizes the solid state devices to benefit from their faster response time in clamping voltage to provide protection until the gas discharge tube switches while continuing to use the gas discharge tube to handle the large current flows sometimes encountered during overvoltage events on telephone communications lines. Examples of devices providing line protection through the use of both solid state devices and gas discharge tubes are described in U.S. Pat. Nos. 4,907,120 to Kaczmarek et al. and 5,721,663 to Smith et al.

Another example of an overvoltage protection circuit is provided in U.S. Pat. No. 4,758,920 to McCartney which includes capacitors in the coupling circuit between the gas discharge protection device and the solid state protection devices. A further approach to coupling the gas discharge and solid state protection components is illustrated in U.S. Pat. No. 5,513,059 to Atkins. The Atkins arrangement includes a positive temperature coefficient resistor and inductor and a capacitor in series connecting respective ones of the tip and ring lines between the gas discharge tube protector and the solid state devices. A further variant on the Atkins configuration is found in the TelTect™ line protector available from Raychem Corporation which includes a protection circuit like that shown in FIG. 1 of the Atkins patent and further includes an additional solid state voltage clamping diode placed across the tip and ring line rather than between the respective input lines and the line protector ground. The additional voltage clamp device is intended to address the potential problem of a differential voltage spike across the tip and ring lines resulting from transient conditions when one side of the gas discharge tube is switched while the other has not yet switched. Such asymmetric switching may transmit the overvoltage event, which is typically received as a linear voltage spike traveling on both the tip and ring line, into a differential voltage event.

Each of these prior art approaches has various limitations. All the various added components of these protection circuits may provide benefits under the conditions for which they are provided but they often create additional limitations on the circuit. For example, balance should be achieved to provide for the proper coordination between the overvoltage arrestor and the solid state voltage clamping devices, particularly when they are intended to operate in a hybrid manner to provide fast response time rather than merely being provided for purposes of back-up protection. These various approaches further may fail to provide protection under certain conditions such as where an overvoltage condition originates within the line protector device on the equipment side of the protection circuit or where a ground potential differential occurs between the line protector and the communications circuit which is being protected which may be located remote from the line protector itself.

OBJECTS AND SUMMARY OF THE INVENTION

In view of the above limitations, it is one object of the present invention to provide a line protector which may provide hybrid protection which tolerates heat generated during operation.

It is a further object of the present invention to provide such a line protector which may protect communications circuits from overvoltage or overcurrent events on the communications circuit side of the protector or when a ground potential difference is present between the communications circuit and the line protector circuit.

In view of these and other objects, the present invention provides a line protector which includes positive temperature coefficient resistors in the circuit which are thermally coupled to voltage clamping devices which require protection from failures caused by overheating from conducting excessive amounts of current for a time sufficient to cause device breakdown. This may compensate for the performance variability of the positive temperature coefficient resistors so as to improve the likelihood that they will experience a sufficient temperature increase to switch before the voltage clamping device reaches a breakdown temperature. Furthermore, protection against current flow to the communications circuit from overvoltage conditions on the circuit side of the line protector or by a ground potential difference between the line protector and the communications circuit is provided by positive temperature coefficient resistors positioned between the overvoltage line protector circuits and the communications circuit.

In one embodiment of the present invention, a line protector is provided for a communications circuit having first and second line input terminals. The line protector includes an overvoltage arrestor having first and second electrodes connected between the first and second line input terminals and a third electrode connected to a line protector ground. One input side further includes a first temperature responsive current protection device having first and second terminals, the first terminal connected to the first line input terminal and a first voltage clamping device having a first terminal connected to the second terminal of the first temperature responsive current protection device and a second terminal connected to the line protector ground. The other input side similarly includes a second temperature responsive current protection device having first and second terminals, the first terminal connected to the second line input terminal and a second voltage clamping device having a first terminal connected to the second terminal of the second temperature responsive current protection device and a second terminal connected to the line protector ground. At least one of the voltage clamping devices is thermally coupled to at least one of the temperature responsive current protection devices. In one embodiment, the thermal coupling includes a thermally conductive adhesive material coupling the components.

The overvoltage arrestor may be a gas discharge tube. The first and second voltage clamping devices may be diodes. The first and second temperature responsive current protection devices may be positive temperature coefficient resistors. The line protector may also include a first inductor device directly connected between the second terminal of the first positive temperature coefficient resistor and the first terminal of the first diode and a second inductor device directly connected between the second terminal of the second positive temperature coefficient resistor and the first terminal of the second diode. In one embodiment, the first and second line input terminals are a telephone tip and a ring line and the first and second positive temperature coefficient resistors and the first and second inductor devices are selected so as to maintain a voltage across the gas discharge tube sufficient to trigger the gas discharge tube when the first and second diodes are triggered by at least one of an AC power line overcurrent event or a lightning event.

In a further embodiment, a third diode is included having a first terminal connected to the second terminal of the first positive temperature coefficient resistor and a second terminal connected to the second terminal of the second positive temperature coefficient resistor. The first and second positive temperature coefficient resistors and the first and second diodes may be matched to the gas discharge tube so as to operate to provide protection by conducting current during an overvoltage event before the gas discharge tube conducts current while maintaining a voltage across the gas discharge tube sufficient to trigger the gas discharge tube.

In another embodiment of the present invention, a line protector for a communications circuit having first and second line input terminals is provided. The line protector includes an overvoltage arrestor having first and second electrodes connected between the first and second line input terminals and a third electrode connected to a line protector ground, a first voltage clamping device having a first terminal connected to the first line input terminal and a second terminal connected to the line protector ground and a second voltage clamping device having a first terminal connected to the second line input terminal and a second terminal connected to the line protector ground. In addition, a third voltage clamping device is included having a first terminal connected to the first line input terminal and a second terminal connected to the second line input terminal. A first temperature responsive current protection device is connected between the first terminal of the third voltage clamping device and the communications circuit and a second temperature responsive current protection device is connected between the second terminal of the third voltage clamping device and the communications circuit. The third voltage clamping device is thermally coupled to at least one of the temperature responsive current protection devices. The third voltage clamping device may be thermally coupled to the at least one of the temperature responsive current protection devices by a thermally conductive adhesive material. In one embodiment, a third temperature responsive current protection device is connected between the first line input terminal and the first voltage clamping device and a fourth temperature responsive current protection device is connected between the second line input terminal and the second voltage clamping device.

In a further aspect of the present invention, a line protector is provided for use on a communications line providing a differential voltage input to a communications circuit device having a voltage clamping device across the differential voltage input, the communications circuit device having a circuit ground remote from a line protector ground. The line protector includes an overvoltage protection circuit having an input side and an output side and coupling the differential voltage input to the line protector ground, the input side being connected to the communications line. A current protection device connects the output side of the overvoltage protection circuit to the communications circuit device that limits current flow from the overvoltage protection circuit to the voltage clamping device of the communications circuit when a ground potential difference is present between the line protector ground and the circuit ground. The current protection device may be a temperature responsive current protection devices connecting each end of the differential voltage input to the communications circuit device. The overvoltage protection circuit may include a gas discharge tube coupling each end of the differential voltage input to the line protector ground, first and second diodes connecting respective ends of the differential voltage input to the line protector ground, and third and fourth temperature responsive current protection devices connecting the first and second diodes, respectively, to the gas discharge tube.

In a further embodiment of the present invention, a line protector for a communications circuit is provided including an overvoltage arrestor having a first and second terminal connected between a first and a second line input terminal and a third terminal connected to a line protector ground. A first temperature responsive current protection device is included having a first terminal and a second terminal, the first terminal connected to the first line input terminal. In addition, an inductor device is included having a first terminal and a second terminal, the first terminal connected to the second terminal of the first temperature responsive current protection device. A first voltage clamping device is included having a first terminal directly connected to the second terminal of the inductor device and a second terminal connected to the line protector ground. Similarly, the other input line may include a second temperature responsive current protection device having a first terminal and a second terminal, the first terminal connected to the second line input terminal, a second inductor device having a first terminal and a second terminal, the first terminal connected to the second terminal of the second temperature responsive current protection device, and a second voltage clamping device having a first terminal directly connected to the second terminal of the second inductor device and a second terminal connected to the line protector ground. The first and second line input terminals may be configured to be connected to a telephone tip and ring line and the first and second positive temperature coefficient resistors and the first and second inductor devices may be selected so as to maintain a voltage across the gas discharge tube sufficient to trigger the gas discharge tube when the first and second diodes are triggered by at least one of an AC power line overcurrent event or a lightning event.

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As will be appreciated by one of skill in the art, the present invention may be embodied as methods, devices (systems) or computer program products. Accordingly, the present invention may take the form of an entirely hardware embodiment, an entirely software embodiment or an embodiment combining software and hardware aspects.

Figure 1:
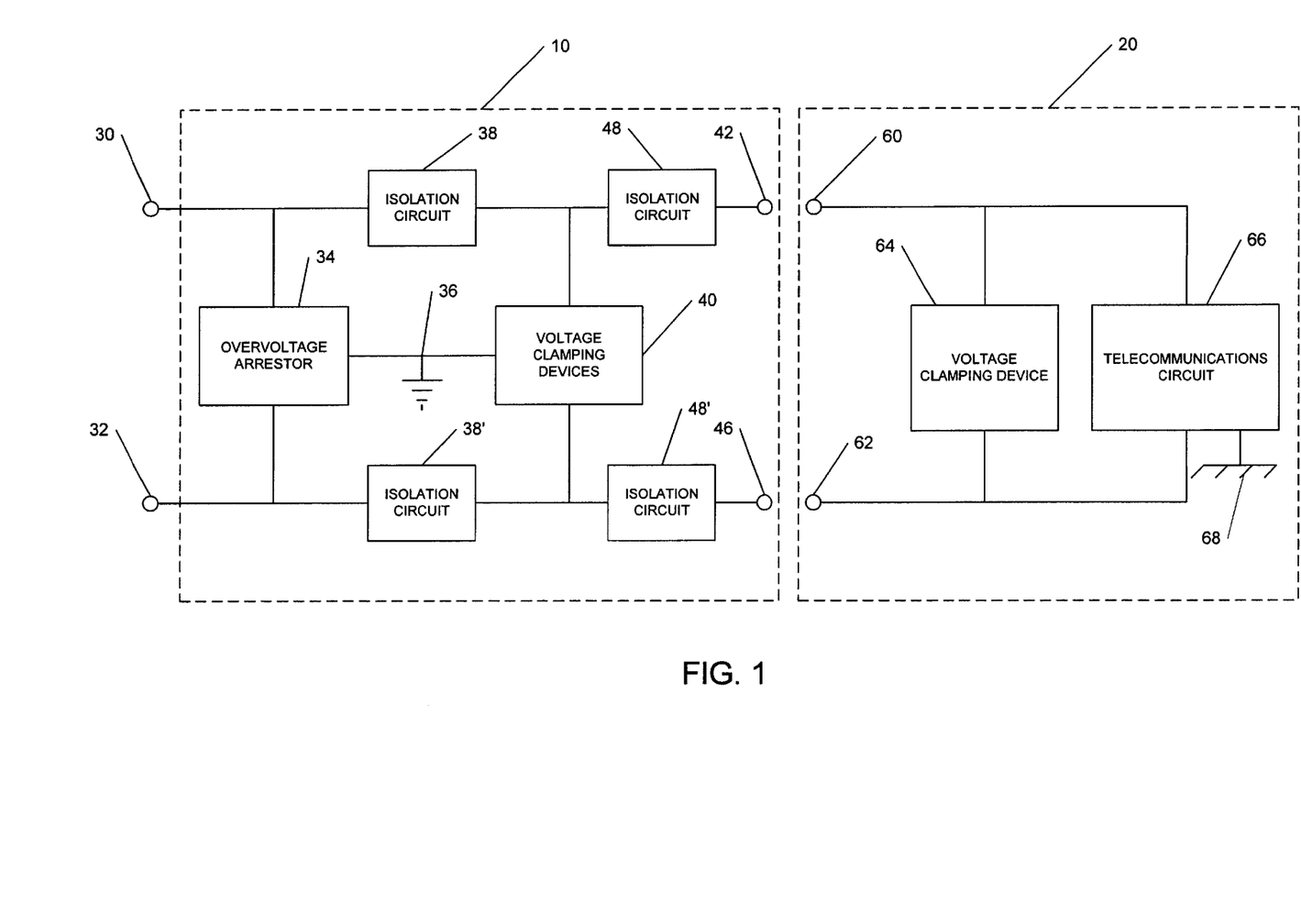
FIG. 1 is a block diagram of a line protector according to an embodiment of the present invention connected to a communications circuit.

An embodiment of the present invention will now be described with reference to the block diagram illustration of FIG. 1 which shows an embodiment of a line protector according to the present invention connected to a communications circuit to be protected. As shown in FIG. 1, line protector 10 is connected to a communications circuit 20 which is to be protected. Line protector 10 receives a first line input terminal 30, such as a tip line of a telephone service wire pair, and a second line input terminal 32, such as a ring line of the telephone service wire pair. First line input terminal 30 and second line input terminal 32 are typically provided for telephone service as a twisted pair wire input from the telephone communications network.

Also shown in the line protector 10 of FIG. 1 is an overvoltage arrestor 34. The overvoltage arrestor 34, as shown in FIG. 1, is connected between the first line input terminal 30 and the second input line input terminal 32 by device terminals (electrodes) and further includes a terminal (electrode) connected to a line protector ground 36. The overvoltage arrestor 34 may be provided as a gas discharge tube or as a transient voltage suppressor thyristor. The overvoltage arrestor 34 is provided to clamp transient voltages that appear across the tip 30 and ring line 32 with respect to the line protector ground 36. An example of a three electrode (terminal) gas discharge tube device suitable for use with the present invention is the MiniTrigard® 2036 rated for 230 volts direct current (VDC) breakdown voltage manufactured by Joslyn Electronics Systems.

In addition to the overvoltage arrestor 34, line protector 10 includes an isolation circuit 38 on the first line input terminal 30 and a corresponding isolation circuit 38' on the second line input terminal 32. The isolation circuits 38, 38' help to provide isolation between the overvoltage arrestor 34 and the voltage clamping device circuit 40 to support hybrid overvoltage and overcurrent protection operations which coordinate the relative advantages and disadvantages of the different types of protection devices used for the overvoltage arrestor 34 and voltage clamping device circuit 40. As will be described further herein, isolation circuits 38, 38' may include temperature responsive current protection devices or inductor devices.

The voltage clamping device circuit 40 may include voltage clamping devices providing protection between each of the line input terminals 30, 32 and the line protector ground 36 and may further include additional protection clamping differential voltages across the line input terminals 30, 32. Suitable devices for use as voltage clamping devices include solid state semiconductor devices such as diodes or avalanche diodes. Alternatively, non-linear resistors may be employed such as zinc oxide, silicone carbide or other varistor materials. Suitable clamping devices include bi-directional clamping diodes, for example, as sold under the tradename TransZorb™. A preferred voltage clamping device may depend upon the line voltages in use in the communications circuit to be protected and include a P6KE24CA device available from General Semiconductor Company.

The line protector 10 illustrated in FIG. 1 further includes isolation circuits 48, 48' positioned between the voltage clamping device circuit 40 and the overvoltage arrestor 34 and the communications circuit 20. Tip line output terminal 42 and ring line output terminal 46 provide the overvoltage and overcurrent protected tip and ring signal from line protector 10 to corresponding to tip line input terminal 60 and ring line input terminal 62 of communications circuit 20.

As shown in the embodiment of the communications circuit 20 in FIG. 1, the communications circuit device includes a voltage clamping device 64 positioned across the differential voltage input from line input terminals 60, 62 as well as additional telecommunications circuitry 66. Also shown in the communications circuit 20 is the circuit ground 68. Typically, in telephone communications line application environments there is at least some degree of distance or isolation between the line protector ground 36 and the communications circuit ground 68 which may, for example, result in a ground potential difference between line protector ground 36 and communications circuit ground 68. Accordingly, the separate ground symbols are used to indicate that there may be a potential difference under certain transient operating conditions between the two grounds.

Figure 2:
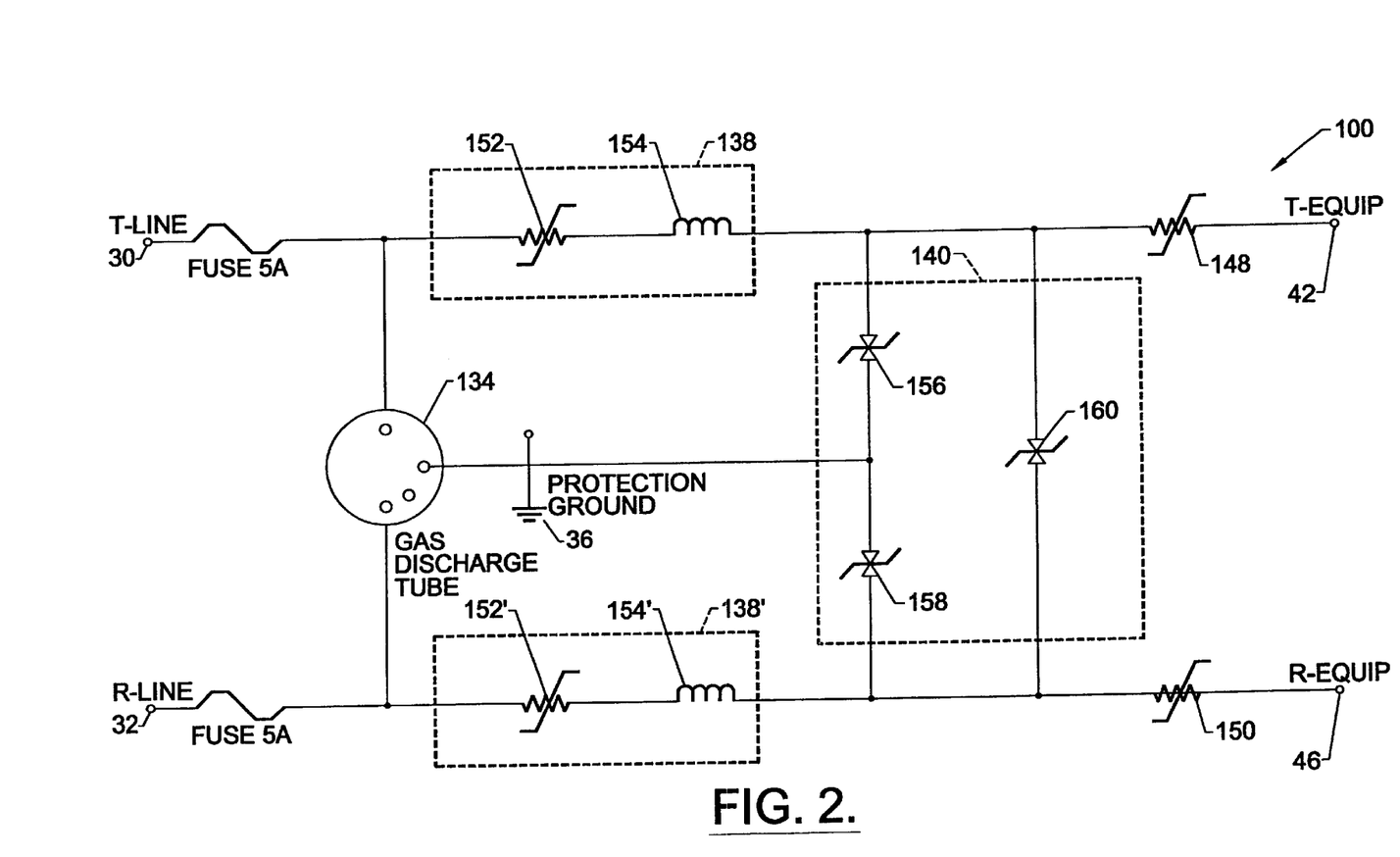
FIG. 2 is an electrical schematic of the line protector of FIG. 1.

Referring now to FIG. 2, an embodiment 100 of the line protector 10 of FIG. 1 is illustrated as an electrical schematic. In the embodiment of FIG. 2, the 230 volt gas discharge tube 134 corresponds to the overvoltage arrestor 34 of FIG. 1. Similarly, like other elements between FIG. 1 and FIG. 2 are provided related numbers in FIG. 2. The isolation circuits 138, 138' in the embodiment of FIG. 2 each include a temperature responsive current protection device 152, 152' connected by one terminal to the tip input line terminal 30 and ring input line terminal 32 respectively. Fuses may also be provided on each input line.

As shown in FIG. 2, the temperature responsive current protection devices 152, 152' are positive temperature coefficient resistor (PTC resistor) devices. Suitable devices for use with the present invention as temperature responsive current protection devices include devices such as ceramic or polymeric PTC devices, preferably polymeric devices, for example, devices available from Raychem Corporation under the registered trademark POLYSWITCH™. In the embodiment of FIG. 2, a TR-250 model POLYSWITCH™ is utilized for the devices 152, 152'.

The isolation circuits 138, 138' in the embodiment of FIG. 2 further include inductor devices 154, 154' connected between a second terminal of the positive temperature coefficient resistors 152, 152' and the voltage clamping devices of voltage clamping device circuit 140. In the embodiment of FIG. 2, the inductor devices have an inductance value of 10 $\mu$H.

The electrical schematic of FIG. 2 shows both line to ground voltage clamping devices and a differential clamping device as being included in the voltage clamping device circuit 140. The voltage clamping devices 156, 158, 160 in the schematic of FIG. 2 are 24 volt TVS diodes available from General Semiconductor Company. Diode 156 has a first terminal connected to the positive temperature coefficient resistor 152 through the inductor device 154. In particular, the diode 156 has a first terminal which is directly connected to the inductor 154 with no intervening capacitor in the circuit. Diode 158 is similarly connected to the positive temperature coefficient resistor 152' through inductor 154' with a direct connection to inductor 154' without an intervening capacitor. Both diode 156 and diode 158 have a second terminal which is connected to the line protector ground 36.

Diodes 156 and 158 are preferably selected to have a clamping voltage which clamps at a voltage level below that at which gas discharge tube 134 triggers and for their fast response capability allowing clamping of voltage by the diodes 156, 158 during fast rising transient overvoltage events before the gas discharge tube 134 switches flow current in response to the overvoltage event. It is desirable, however, to provide sufficient voltage differential across gas discharge tube 134 to insure the gas discharge tube will trigger so as to ground the overvoltage event shortly after current begins to flow through diode 156 or diode 158. If the voltage across gas discharge tube 134 is not maintained at a sufficiently high level (above the devices switching voltage), it may not trigger properly and excessive current could potentially pass through and damage the diodes 156, 158. Accordingly, the first and second positive temperature coefficient resistors 152, 152' and the first and second inductor devices 154, 154' are selected so as to maintain a voltage across the gas discharge tube 134 sufficient to trigger the gas discharge tube 134 when the first and second diode 156, 158 are triggered, for example, by an A/C power line overcurrent event or a lightning event.

As tip and ring lines 30, 32 are typically provided as a twisted wire pair, under normal conditions, overvoltage events either from A/C power line faults or lightning events are typically carried concurrently on both lines and, therefore, do not induce a differential voltage increase across the tip and ring lines 30, 32. The communications circuit 20 typically includes components which are particularly sensitive to such differential voltage signals as they may operate responsive to differential signals input at low level voltages, typically well below 10 volts. Accordingly, even a relatively small differential voltage signal induced by a lightning strike or other line failure event can be problematic.

Such a differential voltage spike condition may result due to variability in the characteristics of the protection devices, in particular, in the gas discharge tube 134. More specifically, the gas discharge tube 134 may not be perfectly uniform side to side in its manufacture. Therefore, one side of the gas discharge tube 134 may trigger and bring the respective tip line 30 or ring line 32 to the level of the line protector ground 36 before the other of the tip line 30 or the ring line 32 is brought to this ground voltage level. Under such conditions, for a transient period of time, an unacceptably high differential voltage may be presented at the output line terminals 42, 46, thereby exposing communications circuit 20 to a high differential voltage input.

Accordingly, in the embodiment of FIG. 2, an additional diode 160 is provided in voltage clamping device circuit 140 which has a first terminal connected through the inductor device 154 to the positive temperature coefficient resistor 152 and a second terminal on the ring line 32 connected through the inductor device 154' to the positive temperature coefficient resistor 152'. Diode 160 thereby operates as a voltage clamp which may prevent large differential voltage signals from being passed through the line protector 10 to the communications circuit 20.

The circuit in FIG. 2 further includes positive temperature coefficient resistors 148, 150. The positive temperature coefficient resistors 148, 150 connect the output side 42, 46 of the overvoltage protection circuit components 134, 138, 138', 140 to the communications circuit 20 and limit current flow from the overvoltage protection circuit elements to the voltage clamping device 64 of the communications circuit 20. Such a current flow may be generated when a ground potential difference is present between the line protector ground 36 and the circuit ground 68. The resistive characteristics of positive temperature coefficient resistors 148, 150 further serve to provide some isolation between voltage clamping device 64 and the line protector 100 to allow matching of the clamping voltage device 64 to facilitate operations of the line protector 100 when current is flowing through voltage clamping device 64 by maintaining a differential additional voltage across the overvoltage protection circuitry of line protector 100 above the clamping voltage of voltage clamping device 64. Such current flow conditions may occur both from the ground potential different circumstance as described previously and can further occur when a fault condition imposes an undesired voltage input on the line protector ground 36 rather than tip or ring line 30, 32 (i.e., a line protector ground fault event). Under such conditions, the diodes 156, 158 may operate by clamping voltage in a manner which induces current flow in the reverse direction which, in turn, may cause the current to flow through towards tip and ring output line terminals 42, 46 and the downstream communications circuit 20.

In selecting the component devices for the positive temperature coefficient resistors 152, 152', 148, 150, the impact of their nominal, off-state resistance should be considered to avoid degradation of signals. If their effective off-state resistance is too high (in combination with any DC resistance of the inductors 154, 154'), then the insertion loss of the protection circuit could attenuate the signalling and/or powering from tip line 30 and ring line 32 sufficiently to interfere with normal operation of communications circuits 20, such as private branch exchange (PBX) telephone sets.

Figure 3:
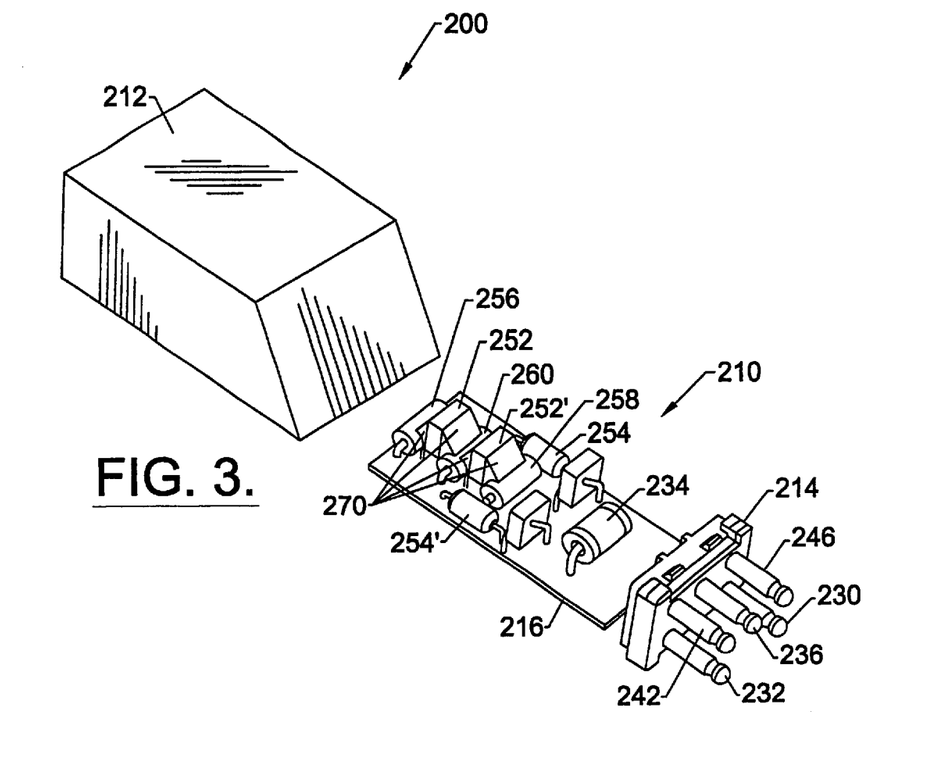
FIG. 3 is a perspective view of a line protector according to an embodiment of the present invention with the cover removed.

Referring now to FIG. 3, an embodiment of a line protector module 200 according to the present invention is shown in perspective view with a housing cover removed. As shown in FIG. 3, line protector module 200 includes a circuit device 210 and a housing cover 212. The circuit device 210 includes a circuit board 216 on which electrical components are mounted and an end plate 214. The end plate 214 is configured to mate with the housing cover 212 to form a protective housing around the circuit board 216 and the electrical components mounted to the circuit board 216. The plate 214 further includes the input and output pins of the line protector module 200 including the tip and ring line input terminals 230, 232, the line protector ground terminal 236 and the tip and ring line output terminals 242, 246.

Various of the electrical component devices described previously in connection with FIG. 2 are shown in FIG. 3 with related numbers. In particular, a gas discharge tube 234 and diodes 256, 258 and 260 are illustrated. As shown in the embodiment of FIG. 3, the positive temperature coefficient resistors 252, 252' are interspersed and mounted adjacent the diodes 256, 258 and 260. This close adjacent proximity facilitates thermal transfer between the diodes 256, 258, 260 and the positive temperature coefficient resistors 252, 252'. In addition, the thermally conductive adhesive material 270 further thermally couples the positive temperature coefficient resistors 252, 252' to the diodes 256, 258, 260.

Both the adjacent placement and layout of the circuitry as well as the use of the thermally conductive adhesive provide thermal coupling between one or more of the voltage clamping devices 256, 258, 260 and one or more of the positive temperature coefficient resistors 252, 252' so as to reduce the likelihood that the positive temperature coefficient resistors 252, 252' will react too slowly to protect the diodes 256, 258, 260 from damage by heat generated in the diodes when they conduct current. This is particularly advantageous in that it may allow the use of smaller diode devices thereby allowing smaller packaging size for the line protector 200. This smaller size capability results from the fact that diodes with higher current ratings typically are provided in larger packages as the larger package size creates a greater thermal mass allowing more energy absorption before break down and damage to the materials of the diodes causing device failures.

The placement of components to support thermal conduction as shown in FIG. 3 also may be applied to the additional positive temperature coefficient resistors 148, 150 illustrated in the embodiment of FIG. 2. With respect to the illustrated embodiment of FIG. 2, the diodes 156, 158 may be mounted adjacent to the positive temperature coefficient resistors 148, 150, respectively, and thermally coupled by thermally conductive adhesive. As described with reference to FIG. 3, this may provide an additional protection performance advantage by promoting faster trip time whereby the positive temperature coefficient resistors 148, 150 respond to heating which occurs in the diodes 156, 158 during ground potential difference current flow into the protected equipment.

An additional performance advantage of the embodiment as illustrated in FIG. 2, which includes a direct connection between the inductor device 154 and the diode 156 and similarly the inductor device 154' and the diode 158, is the better matching capability for protecting communications equipment 20 through faster response time and through eliminating a DC voltage offset between the diodes 156, 158 and the communications equipment 20 which may be present in prior art devices such as that in U.S. Pat. No. 4,758,920. Furthermore, this approach without the use of the capacitor may be beneficially utilized even in telephone communication systems where the tip and ring lines 30, 32 carry both the communications signal and a DC component which provides a power source to various circuitry which may be contained in the communications circuit 20. Applications using such DC powering from a PBX or a central office over the tip and ring lines 30, 32 typically utilize DC voltage levels between about 12 volts and about 48 volts. However, the use of a circuit with and a direct connection between the inductors 154, 154' and the diodes 156, 158 may be limited in the ranges of DC power voltages which are suitable for use with the line protector as the diode clamping voltages typically are selected below the DC power voltage. Accordingly, for example, in the embodiment of FIG. 2 where 24 volt diodes are provided, the DC power voltage level for the application is preferably less than 24 volts and, more preferably, no more than 20 volts.

In the drawings and specification, there have been disclosed typical preferred embodiments of the invention and, although specific terms are employed, these terms are used in a generic and descriptive sense only and not for purposes of limitation, the scope of the invention being set forth in the following claims:

That which is claimed is:

1. A line protector for a communications circuit having first and second line input terminals, the line protector comprising:

an overvoltage arrestor having first and second electrodes connected between the first and second line input terminals and a third electrode connected to a line protector ground;

a first temperature responsive current protection device having first and second terminals, the first terminal connected to the first line input terminal;

a first voltage clamping device having a first terminal connected to the second terminal of the first temperature responsive current protection device and a second terminal connected without an intervening capacitor to the line protector ground;

a second temperature responsive current protection device having first and second terminals, the first terminal connected to the second line input terminal;

a second voltage clamping device having a first terminal connected to the second terminal of the second temperature responsive current protection device and a second terminal directly connected to the line protector ground;

at least one of the voltage clamping devices being thermally coupled to at least one of the temperature responsive current protection devices;

a first inductor device directly connected between the second terminal of the first temperature responsive current protection device and the first terminal of the first voltage clamping device;

a second inductor device directly connected between the second terminal of the second temperature responsive current protection device and the first terminal of the second voltage clamping device; and wherein the first and second temperature responsive current protection devices and the first and second inductor devices are selected so as to maintain a voltage across the overvoltage arrestor sufficient to trigger the overvoltage arrestor when the first and second voltage clamping devices are triggered by at least one of an AC power line overcurrent event or a lightning event.

2. A line protector according to claim 1 wherein the first and second line input terminals are a telephone tip and a ring line.

3. A line protector for a communications circuit having first and second line input terminals, the line protector comprising:

a gas discharge tube having first and second electrodes connected between the first and second line input terminals and a third electrode connected to a line protector ground;

a first positive temperature coefficient resistor having first and second terminals, the first terminal connected to the first line input terminal;

a first voltage clamping diode having a first terminal connected to the second terminal of the first positive temperature coefficient resistor and a second terminal connected to the line protector ground;

a second positive temperature coefficient resistor having first and second terminals, the first terminal connected to the second line input terminal;

a second voltage clamping diode having a first terminal connected to the second terminal of the second positive temperature coefficient resistor and a second terminal connected to the line protector ground;

at least one of the voltage clamping diodes being thermally coupled to at least one of the positive temperature coefficient resistors; and a third voltage clamping diode having a first terminal connected to the second terminal of the first positive temperature coefficient resistor and a second terminal connected to the second terminal of the second positive temperature coefficient resistor so as to operate responsive to a differential voltage signal across the first and second line input terminals.

4. A line protector for a communications circuit having first and second line input terminals, the line protector comprising:

an overvoltage arrestor having first and second electrodes connected between the first and second line input terminals and a third electrode connected to a line protector ground;

a first voltage clamping device having a first terminal connected to the first line input terminal and a second terminal connected to the line protector ground;

a second voltage clamping device having a first terminal connected to the second line input terminal and a second terminal connected to the line protector ground;

a third voltage clamping device having a first terminal connected to the first line input terminal and a second terminal connected to the second line input terminal;

a first temperature responsive current protection device connected between the first terminal of the third voltage clamping device and the communications circuit;

a second temperature responsive current protection device connected between the second terminal of the third voltage clamping device and the communications circuit;

a third temperature responsive current protection device connected between the first line input terminal and the first voltage clamping device;

a fourth temperature responsive current protection device connected between the second line input terminal and the second voltage clamping device; and wherein the third voltage clamping device is thermally coupled to at least one of the temperature responsive current protection devices.

5. A line protector according to claim 4 wherein the third voltage clamping device is thermally coupled to the at least one of the temperature responsive current protection devices by a thermally conductive adhesive material.

6. A line protector for use on a communications line providing a differential voltage input to a communications circuit device having a voltage clamping device across the differential voltage input, the communications circuit device having a circuit ground remote from a line protector ground, the line protector comprising:

an overvoltage protection circuit having an input side and an output side and coupling the differential voltage input to the line protector ground, the input side being connected to the communications line;

a current protection device connecting the output side of the overvoltage protection circuit to the communications circuit device and limits current flow from the overvoltage protection circuit to the voltage clamping device of the communications circuit when a ground potential difference is present between the line protector ground and the circuit ground; and wherein the overvoltage protection circuit includes a voltage clamping device and at least one temperature responsive current protection device and wherein the voltage clamping device is thermally coupled to the at least one temperature responsive current protection device by a thermally conductive adhesive material.

7. A line protector according to claim 6 wherein the current protection device comprises temperature responsive current protection devices connecting each end of the differential voltage input to the communications circuit device.

8. A line protector according to claim 7 wherein the overvoltage protection circuit further comprises:

a gas discharge tube coupling each end of the differential voltage input to the line protector ground;

wherein the voltage clamping device of the overvoltage protection circuit comprises first and second diodes connecting respective ends of the differential voltage input to the line protector ground; and wherein the at least one temperature responsive current protection device of the overvoltage protection circuit comprises third and fourth temperature responsive current protection devices connecting the first and second diodes, respectively, to the gas discharge tube.

9. A line protector for a communications circuit, the line protector comprising:

an overvoltage arrestor having a first and second terminal connected between a first and a second line input terminal and a third terminal connected to a line protector ground;

a first temperature responsive current protection device having a first terminal and a second terminal, the first terminal connected to the first line input terminal;

an inductor device having a first terminal and a second terminal, the first terminal connected to the second terminal of the first temperature responsive current protection device;

a first voltage clamping device having a first terminal directly connected to the second terminal of the inductor device and a second terminal connected without an intervening capacitor to the line protector ground; and wherein the first temperature responsive current protection device and the inductor device are selected so as to maintain a voltage across the overvoltage arrestor sufficient to trigger the overvoltage arrestor when the first voltage clamping device is triggered by at least one of an AC power line overcurrent event or a lightning event.

10. A line protector according to claim 9 further comprising:

a second temperature responsive current protection device having a first terminal and a second terminal, the first terminal connected to the second line input terminal;

a second inductor device having a first terminal and a second terminal, the first terminal connected to the second terminal of the second temperature responsive current protection device; and a second voltage clamping device having a first terminal directly connected to the second terminal of the second inductor device and a second terminal connected to the line protector ground.

11. A line protector according to claim 10 wherein the overvoltage arrestor is a gas discharge tube, the first and second voltage clamping devices are diodes, and the first and second temperature responsive current protection devices are positive temperature coefficient resistors.

12. A line protector according to claim 11 wherein the first and second line input terminals are configured to be connected to a telephone tip and ring line, and wherein the first and second positive temperature coefficient resistors and the first and second inductor devices are selected so as to maintain a voltage across the gas discharge tube sufficient to trigger the gas discharge tube when the first and second diodes are triggered by at least one of an AC power line overcurrent event or a lightning event.

13. A line protector for a communications circuit, the line protector comprising:

an overvoltage arrestor having a first and second terminal connected between a first and a second line input terminal and a third terminal connected to a line protector ground;

a first temperature responsive current protection device having a first terminal and a second terminal, the first terminal connected to the first line input terminal;

an inductor device having a first terminal and a second terminal, the first terminal connected to the second terminal of the first temperature responsive current protection device;

a first voltage clamping device having a first terminal directly connected to the second terminal of the inductor device and a second terminal connected without an intervening capacitor to the line protector ground;

wherein the first temperature responsive current protection device and the inductor device are selected so as to maintain a voltage across the overvoltage arrestor sufficient to trigger the overvoltage arrestor when the first voltage clamping device is triggered by at least one of an AC power line overcurrent event or a lightning event;

a second temperature responsive current protection device having a first terminal and a second terminal, the first terminal connected to the second line input terminal;

a second inductor device having a first terminal and a second terminal, the first terminal connected to the second terminal of the second temperature responsive current protection device;

a second voltage clamping device having a first terminal directly connected to the second terminal of the second inductor device and a second terminal connected to the line protector ground; and a third diode having a first terminal connected to the second terminal of the first inductor device and a second terminal connected to the second terminal of the second inductor device.

* * * * *